United States Patent
Tran et al.

(10) Patent No.: US 10,205,374 B2
(45) Date of Patent: Feb. 12, 2019

(54) TRAN PRINCIPLES, METHODS OF DC PULSE ELECTRIC DEVICE WITHOUT MOVING PARTS

(71) Applicants: Toan Cong Tran, Purmerend (NL); Michael Giao Thien Nguyen, Malvern, PA (US); Annalisa Tran Torrente, Thornton, PA (US); Nhu Ha Thi Tran, Purmerend (NL); Toan Cong Tran, Purmerend (NL)

(72) Inventors: Toan Cong Tran, Purmerend (NL); Michael Giao Thien Nguyen, Malvern, PA (US); Annalisa Tran Torrente, Thornton, PA (US); Nhu Ha Thi Tran, Purmerend (NL); Toan Cong Tran, Purmerend (NL)

( * ) Notice: Subject to any disclaimer, the term of this patent is extended or adjusted under 35 U.S.C. 154(b) by 482 days.

(21) Appl. No.: 14/998,670

(22) Filed: Feb. 1, 2016

(65) Prior Publication Data

US 2017/0221627 A1    Aug. 3, 2017

(51) Int. Cl.
| | |
|---|---|
| H01F 27/42 | (2006.01) |
| H01F 37/00 | (2006.01) |
| H01F 38/00 | (2006.01) |
| H02K 99/00 | (2014.01) |
| H02K 53/00 | (2006.01) |

(52) U.S. Cl.
CPC ............. *H02K 99/00* (2016.11); *H02K 53/00* (2013.01); *Y10S 74/09* (2013.01)

(58) Field of Classification Search
CPC ...... B60L 5/005; B60L 11/182; H01F 27/006; H01F 38/14; H02G 7/16; H02J 5/005; H02J 7/025; H02J 17/00; H02J 50/00; H02J 50/05; H02J 50/10; H02J 50/12; H02J 50/15; H02J 50/20; H02J 50/23; H02J 50/27; H02J 50/30; H02J 50/40; H02J 50/50; H02J 50/60

USPC .......................................................... 307/104

See application file for complete search history.

(56) References Cited

U.S. PATENT DOCUMENTS

| | | | |
|---|---|---|---|
| 4,006,401 A | 2/1977 | Villasenor de Rivas | |
| 4,016,473 A | 4/1977 | Newman | |
| 4,103,221 A | 7/1978 | Fukui et al. | |
| 5,773,969 A | 6/1998 | Nakayam et al. | |
| 6,362,718 B1 * | 3/2002 | Patrick | H01F 29/14 336/214 |
| 6,677,730 B2 | 1/2004 | Bodini et al. | |
| 6,946,938 B1 * | 9/2005 | Pedersen | H02K 19/02 335/296 |
| 7,923,814 B2 * | 4/2011 | Jeong | H01L 21/2855 257/528 |

(Continued)

FOREIGN PATENT DOCUMENTS

EP    2978119 A1 *    1/2016    ............. H01F 27/38

*Primary Examiner* — Anh Q Tra

(57) ABSTRACT

A time-varying current from a DC voltage-source, flows through a primary winding of a magnetic circuit containing permanent magnets, induces more inductive voltages across different windings. The windings are wrapped around the main, sub-magnetic paths of different forms and constructions of the Tran-generators.

The invention when combined with any one of recovering the utilized electric charge, using the (hybrid) soft magnetic wires, applying the Voltage-Doubler circuits, and using the transfer of high-potential electric charge to generate more electric energy, make the tran-generators useful.

13 Claims, 10 Drawing Sheets

(56) References Cited

U.S. PATENT DOCUMENTS

| | | |
|---|---|---|
| 7,928,700 B2 | 4/2011 | Cour |
| 8,350,654 B2 * | 1/2013 | Tran ..................... H02K 99/00 336/110 |
| 8,975,997 B2 * | 3/2015 | Tonoyama ............ H01F 27/255 336/200 |
| 9,997,950 B2 * | 6/2018 | Bae ......................... H01Q 7/00 |
| 2004/0057255 A1 | 3/2004 | Patrick et al. |
| 2005/0156702 A1 | 7/2005 | Marshall |
| 2005/0189927 A1 | 9/2005 | Myers |
| 2007/0007844 A1 | 1/2007 | Barbat |
| 2008/0191821 A1 | 8/2008 | Protze |
| 2010/0264730 A1 | 10/2010 | Tran |

* cited by examiner

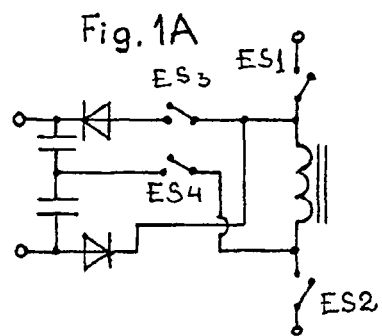
Fig. 1A
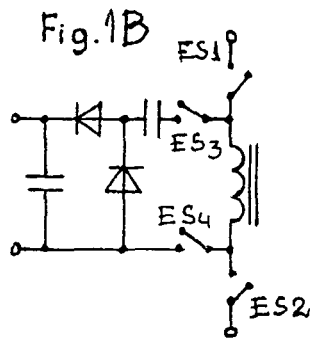
Fig. 1B
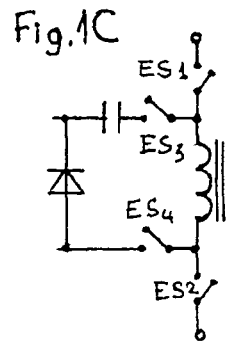
Fig. 1C
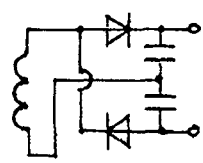
Fig. 1D
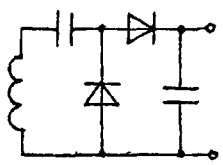
Fig. 1E
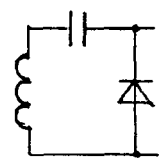
Fig. 1F
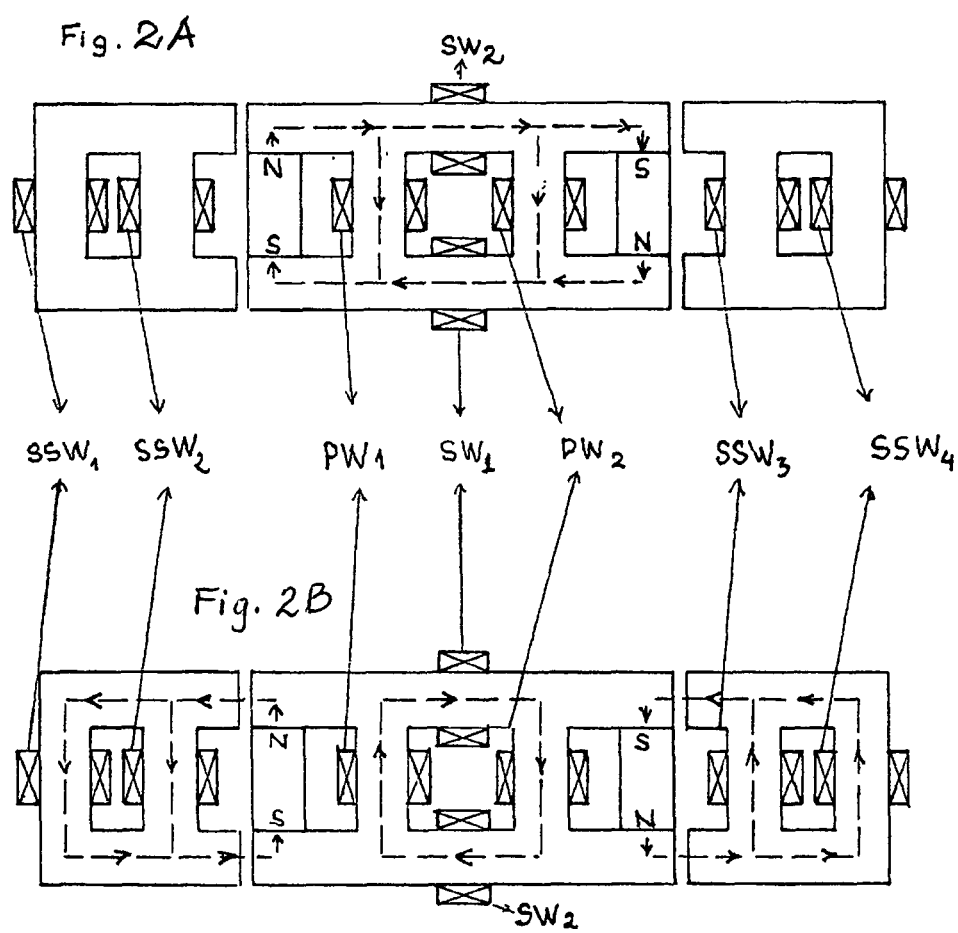
Fig. 2A
Fig. 2B

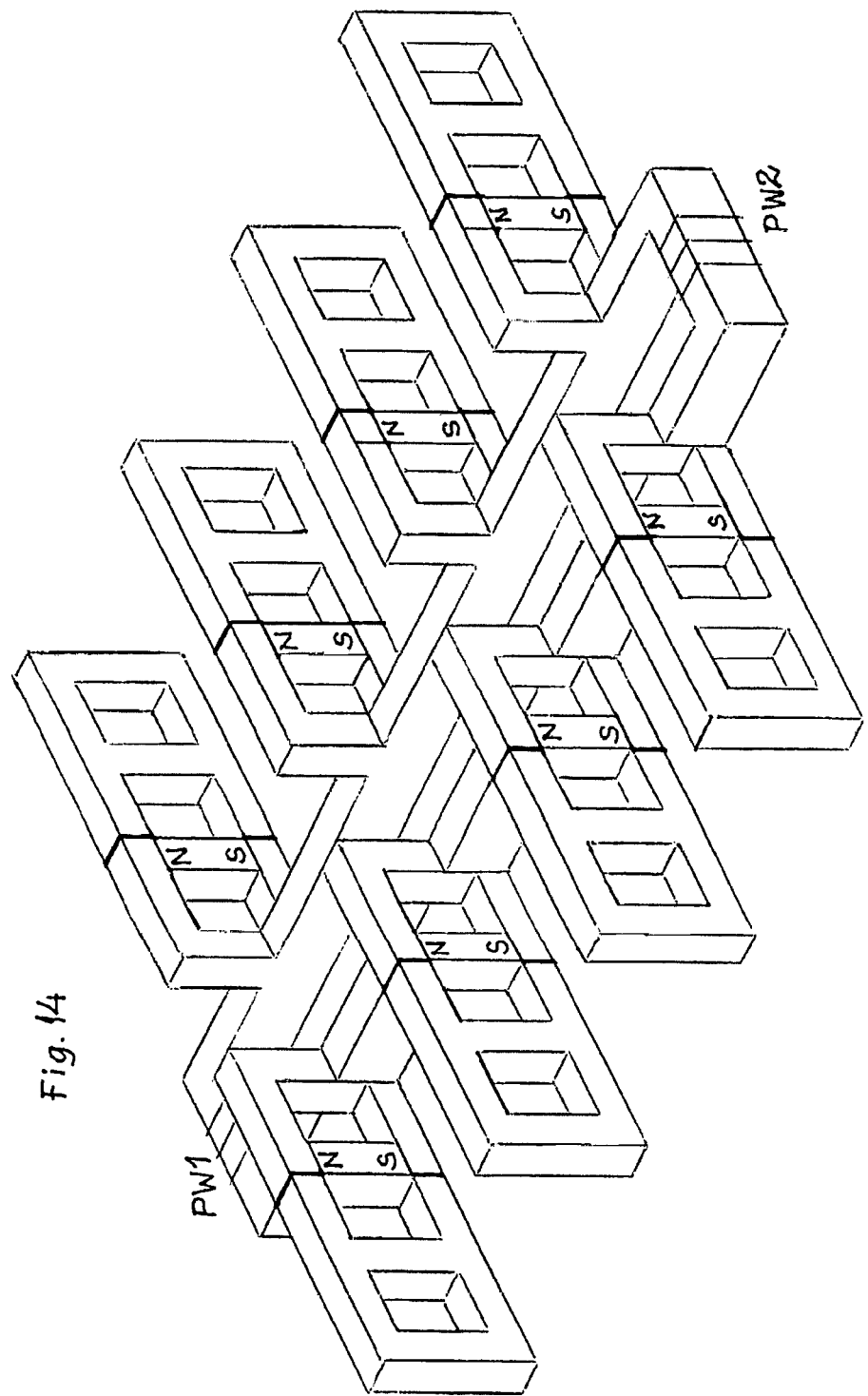

TRAN PRINCIPLES, METHODS OF DC PULSE ELECTRIC DEVICE WITHOUT MOVING PARTS

FIELD OF THE INVENTION

The present invention relates to principles and methods for recovering of electric charge utilized to energize primary winding, and optionally, recovering of electric charge supplied to all instruments of the machines; regaining electric energy, stored in primary winding, when magnetic field in the primary winding collapse; or when magnetic flux of permanent magnet, in magnetic circuit containing permanent magnets, returned to the main-magnetic circuit; harvesting electric energy from secondary winding, from sub-ordinated (sub) secondary windings, when magnetic flux in primary winding changed, or when magnetic flux of permanent magnet flows through the sub-secondary winding or primary winding to make a closed magnetic circuit; generating electric energy during the time of transferring high-potential electric charge, (stored in appropriate capacitors of electric circuits of primary, secondary and sub-secondary windings) to a selected battery.

Meaning of words, used in the application, are:
  Main magnetic path (core): contains primary, secondary coil of winding and embedded permanent magnets; keeps magnetic flux of permanent magnet(s) flowing, originally in this path, if no presence of magnetic flux of primary coil of winding.
  Subordinate (sub) paths: are disconnected with the main magnetic path by air-gaps; keeps magnetic flux of permanent magnet(s) flowing in the sub-magnetic path, when the main magnetic path is occupied by magnetic flux from electric pulse through the primary coil of winding.
  Sub-secondary voltages come from sub-secondary coils of winding, those are wrapped around the sub-magnetic paths.
  All electronic switches used in the electric circuit have preferably, no intrinsic diode.

The present invention further includes reducing numbers of turns in secondary, sub-secondary windings and electronic components by applications of Voltage-Doubler circuits such as Villard, Greinarcher and Delon (Bridge) circuit. The Voltage-Doubler technique is also applicable in primary winding which must have two electronic switches ES3 and ES4. (FIG. 1A-1C).

Using not only high-electric-conductivity magnetic wire/foils (such as magnetic copper wires/foils), but also magnetic wire/foils, made of soft magnetic material or multi-strand magnetic wires/foils combined of soft magnetic materials and for example copper; or soft magnetic material clad copper wires/foils, in order to make high-efficiency electric generators without moving pails, hereafter, for simplicity called Tran-generators.

BACKGROUND ART

The Principles of the Tran-energy machines US patent US35,654 (WO 2009/112877) and PCT number PCT/IB200800796, which is incorporated herein by reference, describes the principles in the recovery of electric energy derived from the energizing of primary winding after producing the desired work, and harvesting the electric energy from secondary winding caused by increasing and decreasing in magnetic flux of primary winding during energizing and de-energizing.

EPO application 14075049.8-1809, which is incorporated herein, describe a method and circuit for capturing electric energy utilized in energizing coils with capacitors and utilizing the capacitors as part of a voltage source to energize the coils.

The method that utilizes a time-varying current to build up a changing magnetic field in primary coil of a transformer. The changing magnetic field can:
  1—interact with another magnetic field to perform desired work(s);
  2—induce an inductive voltage across the secondary coil of winding on the main magnetic path;
  3—deflect the magnetic flux of permanent magnet in the main magnetic path, consequently magnetic flux of permanent magnets springs over air gaps to a subordinate (sub) magnetic path (less reluctance), therefore sub-inductive voltages appear across the sub-secondary windings, wrapped around the main-, sub-magnetic paths.

High-potential electric charge from voltage-source, after releasing potential energy through a primary coil of winding, can be stored on capacitor, after that, the capacitor is in series with the voltage source, to supply electric charge with high-potential energy to the primary coil of winding. The same method of recovering the utilized electric charge can be applied for all instruments of the device.

In R-L or R-C or R-L-C electric circuits, at DC voltage-source, when switching ON respectively OFF, the current does not reach its desired amperes immediately, respectively zero ampere, but needs a short duration of time to change its values.

Changing current causes changing magnetic flux. This is the basic for DC pulse transformer, moreover, with no voltage-drop full-wave bridge rectifier circuits at primary, secondary and sub-secondary coils of windings, electric energy can be regained, when magnetic flux in primary coil of winding decreases. Simultaneously more electric energy can be harvested at secondary coil of winding, and at sub-secondary coils of winding, wrapped around sub-magnetic paths.

When charging or discharging a voltage-source that consists of capacitors in series or capacitor and battery in series, the same quantity of electric charge will flow through the voltage-source.

High-potential electric charge can be formed and stored in low-leakage, low capacitance and high-voltage capacitor, not only by mean of a suitable capacitance, but also by Voltage-Doubler circuits, if needed. The theoretic operations of Voltage-Doubler and the well-known full-wave bridge rectifier circuit are not described here.

High potential electric changes, stored on appropriate capacitors of primary, secondary, and sub-secondary coils of winding, can be used to recharge the selected voltage source by three ways:
  1—Directly connected with the positive pole of the voltage source or via an electronic switch to control the following order of recharging;
  2—Through a primary winding of a transformer, via an electronic switch, low-side of the transformer is connected with the positive pole of the voltage source. By this way, during the short time of transferring, the high-potential electric charge from capacitor can recharge the voltage source at the same time with inducing an inductive voltage across the secondary winding. Electric energy from the inductive voltage can be stored in appropriate capacitor for the next transferring.

3—The capacitor with high-potential electric charge is in series with an another voltage source that voltage of the one voltage source is equal with the selected voltage source. The in-series voltage source is connected with a primary winding of a transformer-containing permanent magnets via an electronic switch at high-side, low-side of the primary winding of the transformer is via an electronic switch, connected with the positive pole of the selected voltage source. When high-side and low-side switches are ON in a predetermined time, a desired time-varying current flows through the primary winding to recharge the voltage source, at the same time, it induces inductive voltages across all windings, related with the changing magnetic field of the primary winding. When high-side and low-side switches are OFF, electric energy in all windings flows to the appropriate capacitors, stored there and ready for the next transferring. The no voltage-drop full-wave bridge rectifier circuits or the voltage-doubler circuits are not described here.

With two electronic switches, preferably without intrinsic body diode, at high-side and low-side, in OFF position, the primary coil of winding becomes an isolated voltage source, when regaining electric energy from collapsed magnetic field or the coming and going of magnetic field from permanent magnets, related with the primary winding.

Directions of magnetic flux of permanent magnets can be deflected by interaction with changing magnetic flux of primary winding. Owing to this, more inductive voltages appear across the coils of winding, wrapped around the main magnetic core, the sub-magnetic cores. Therefore, more electric energy can be harvested.

Soft magnetic materials with high magnetic permeability, low coercive force, can be used as magnetic wires. A multi-strand magnetic wire, combined of soft magnetic wire and for example, copper magnetic wires, or specially, magnetic wires, made of soft-magnetic material clad copper wire can be used to reduce the electric resistance and increase the strength of magnetic fields. Further drawing and description about these coils of winding, shall be done in the next application for patent of the Tran motors\generators.

For electronic switches, controllable switching ON\OFF in following order is essential to make very high-efficiency Tran-generators.

SUMMARY OF THE INVENTION

The present invention relates to principles and methods to make an integrated energy conversion device, without moving part. The principles are based on:

Determination of timing ON and OFF in order to energize and de-energize the primary winding. ON-time is long enough to build up a desired changing magnetic field in primary winding, OFF-time is long enough for regaining electric energy, stored in the primary winding; for harvesting electric energy stored in all secondary and sub-secondary windings These windings are related with the changing magnetic field in the primary winding.

Using a time-varying current to build up a changing magnetic field in primary winding of a transformer containing permanent magnets. The changing magnetic field can:

1—interact with another magnetic fields from permanent magnets to perform desired work(s);

2—induce an inductive voltage across the secondary winding on the main-magnetic path;

3—deflect magnetic flux of permanent magnet(s) in the main magnetic path (least reluctance).

Consequently, magnetic flux of permanent magnets spring over air gaps to flow in sub-magnetic paths (less reluctance), in order to make a closed magnetic loop.

Recovering electric energy, utilized to energize primary winding, and if needed, recovering of electric energy, supplied to all instruments of the machines.

Regaining electric energy, stored in primary winding, when magnetic field in its winding is collapsed and\or by comings and goings of magnetic flux from permanent magnets.

Harvesting electric energy from secondary and sub-secondary windings when magnetic flux in primary winding changed; or by comings and goings of magnetic flux from permanent magnets, inductive voltages appear across all related windings (those are related with the changing magnetic field in the primary winding), wrapped around the main, sub-magnetic paths.

Transferring high-potential electric charge, stored in capacitor, in a predetermined time to the voltage source via a primary winding of a transformer. During the predetermined time, electric energy is generated at the secondary winding.

Electric circuit with voltage-doubler is applied in order to:
increase voltage of electric charge, stored in low-leakage capacitor;
reduce winding turns of secondary and sub-secondary windings wrapped around the main and sub-magnetic paths;
reduce electronic components in comparison with full-wave bridge rectifier circuit.

Using magnetic wires\foils, made of soft magnetic materials or multi-strand magnetic wires\foils combined of soft magnetic materials such as copper or soft magnetic material clad supper wires\foils.

According to an aspect of the invention, electric charge supplied to the primary winding is stored in separated capacitor or battery, not directly to the ground.

According to another aspect of the invention, all electric charge derived from collapsed magnetic field (de-energizing phase) in the primary winding is stored in appropriate capacitor.

According to another aspect of the invention, high-potential electric charge can be transferred directly from charged capacitors to their respective batteries; or via a primary winding of a transformer, to the positive pole of a selected battery. By this way, inductive voltages appear across secondary winding.

According to another aspect of the invention, high-potential electric charge from capacitor that is in series with a voltage source can be transferred through a primary winding of a transformer containing permanent magnets to the positive pole of respective battery. During energizing and de-energizing phase, inductive voltages appear across all related windings and a regaining electric energy during the de-energizing phase.

DESCRIPTION OF THE DRAWINGS

In all figures:

⬚: Permanent magnet with N: North pole, S: South pole.

Figure 3:
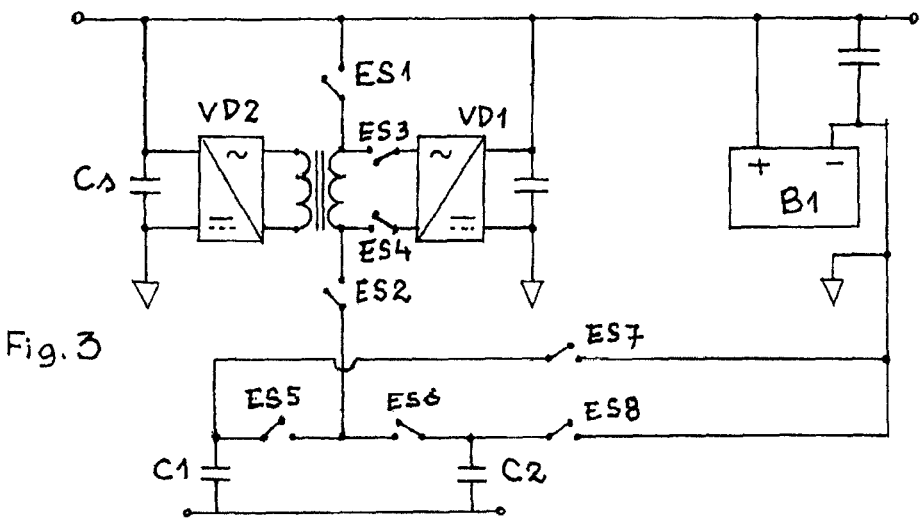

→: Permanent magnet with ↑ as North pole.

ξ: Primary coil of winding or secondary coil of winding or an magnetic circuit containing permanent magnets.

⊠: coil of winding.

PW1; PW2 . . . Primary coil of winding 1; 2.

SW1; SW2 ... Secondary coil of winding 1; 2.

SSW1; SSW2; ... Subordinate (sub-)secondary coil of winding 1, 2, ... wrapped around the sub-magnetic paths or main-magnetic path. The inductive voltages of these sub-secondary windings are induced by the coming and going of magnetic flux from permanent magnets, embedded in the main-magnetic path.

AG1; AG2; ... Air-gap 1, air-gap 2

ES1; ES2; ... Electronic switch 1; 2, they preferably have no intrinsic body diode.

VD1; VD2; ... Voltage-Doubler 1, Voltage-Doubler 2 or no voltage-drop lull-wave rectifiers 1; 2 ... Operation theories of Voltage-doubler or full-wave bridge rectifier are not described here.

D1; D2; ... Diodes 1; diode 2; ... or rectifier1, rectifier2 with almost no-voltage drop, such as Smart Bypass Diode or active rectifier (combination of MOSFET with OP AMP).

→: ... Magnetic flux direction.

C1; C2; ... Capacitor 1; Capacitor 2; ...

Cp1 ... Capacitor p1, for storage of high-potential electric charge from primary winding;

Cs1 ... Capacitor s1, for storage of high-potential electric charge from (sub-(secondary winding;

B1; B2; B3 ... Battery 1; Battery 2; Battery 3 ...

Tp1; Ts1; ... Transformer 1, Transformer 2, wherein the primary winding is also used for transferring electric charge to the selected voltage-source.

FIGS. 1A-1C are schematic view of a method and circuit for regaining electrical energy using voltage-doubler of primary winding.

FIGS. 1D-1F are schematic view of a method and circuit for harvesting electrical energy using voltage-doubler of secondary winding.

FIGS. 2A-2B are schematic view of a method and circuit for recovering electrical energy using modified multiple magnetic cores, permanent magnets and sub-magnetic core separated by air gaps.

FIG. 3 shows the recovery of utilized electric charge with an electric circuit containing two identical capacitors in parallel.

Figure 4:
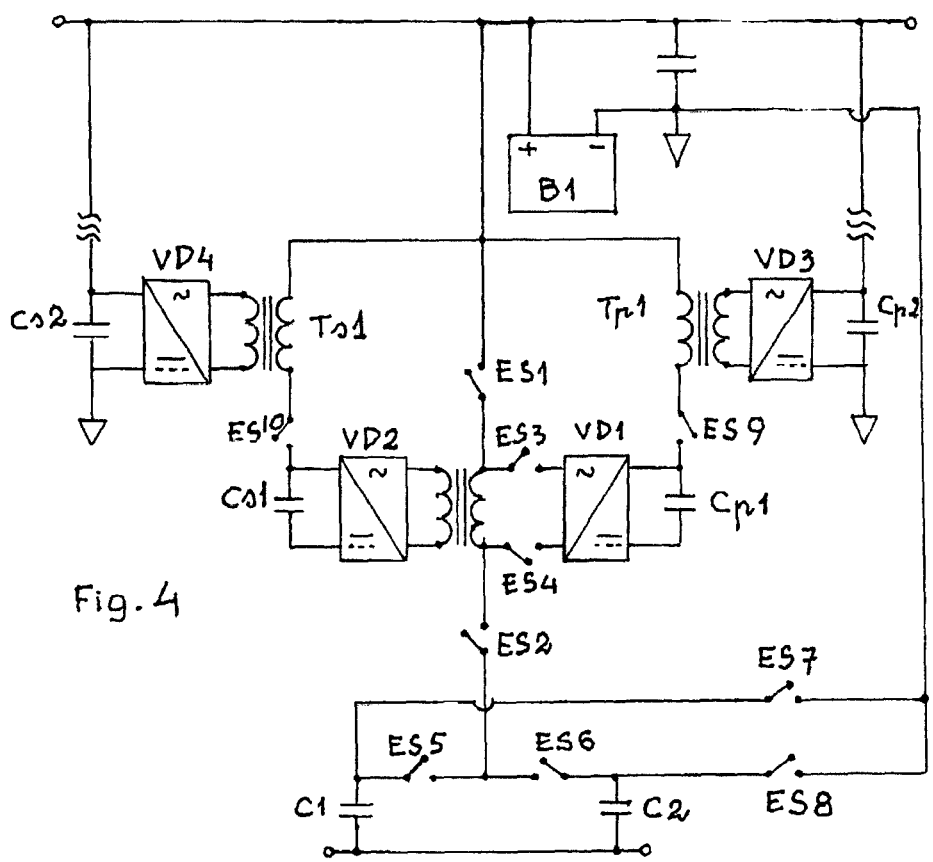
Figure 5:
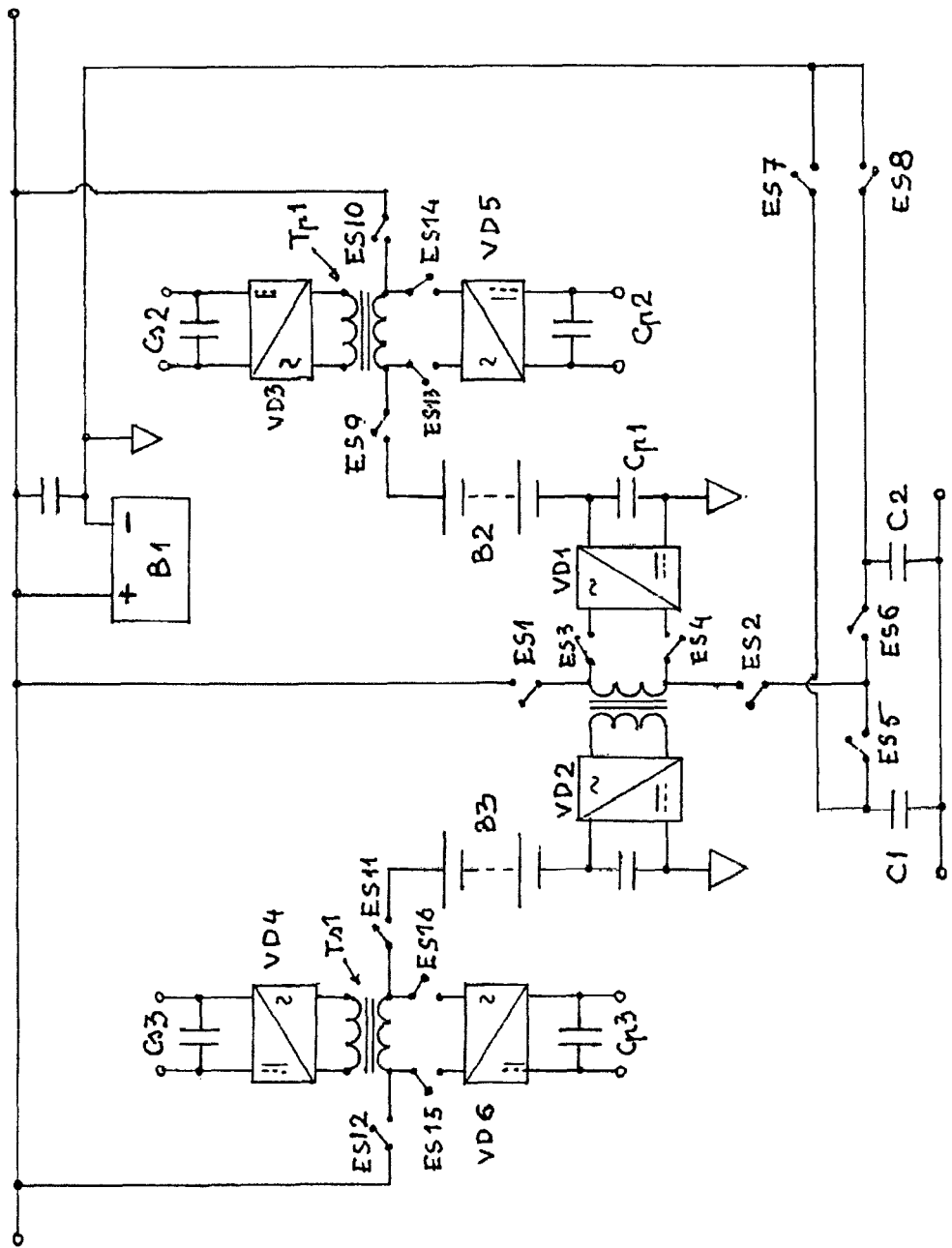

FIG. 4 and FIG. 5 show the schematic view of recovery of utilized electric charge with an electric circuit containing two identical capacitors in parallel and extended recovering and harnessing of electric energy.

Figure 6:
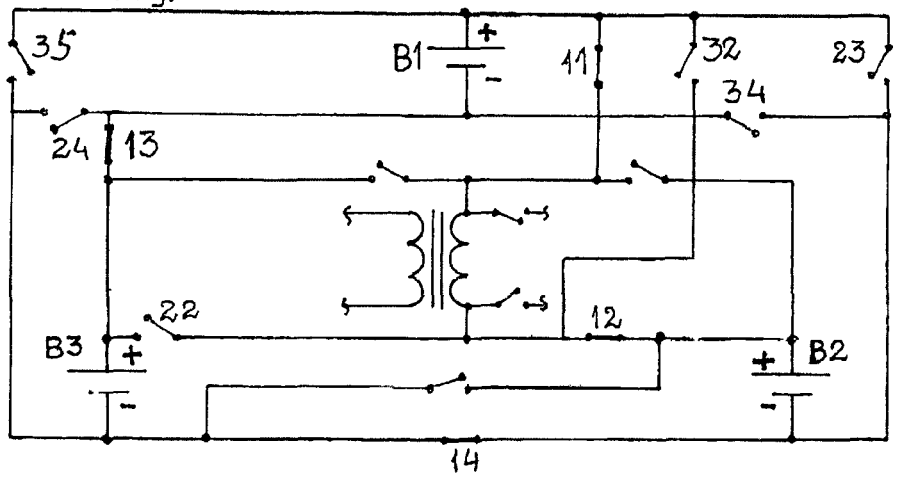
Figure 7:
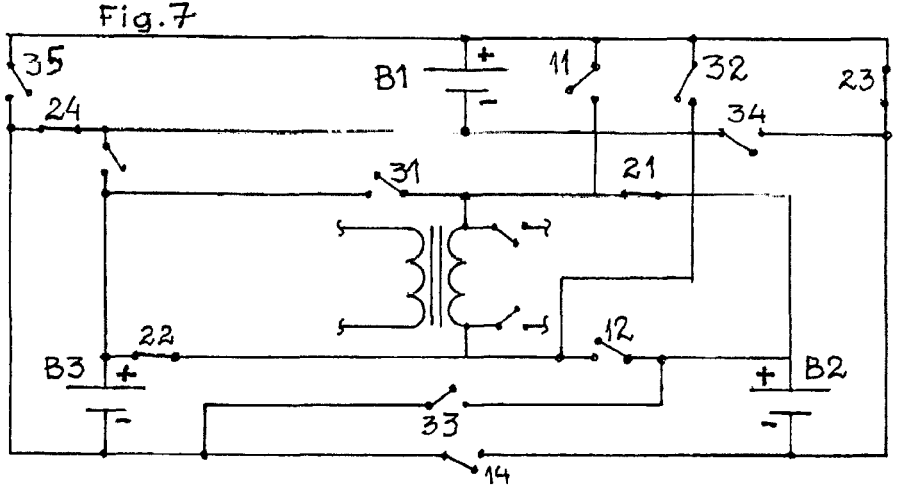
Figure 8:
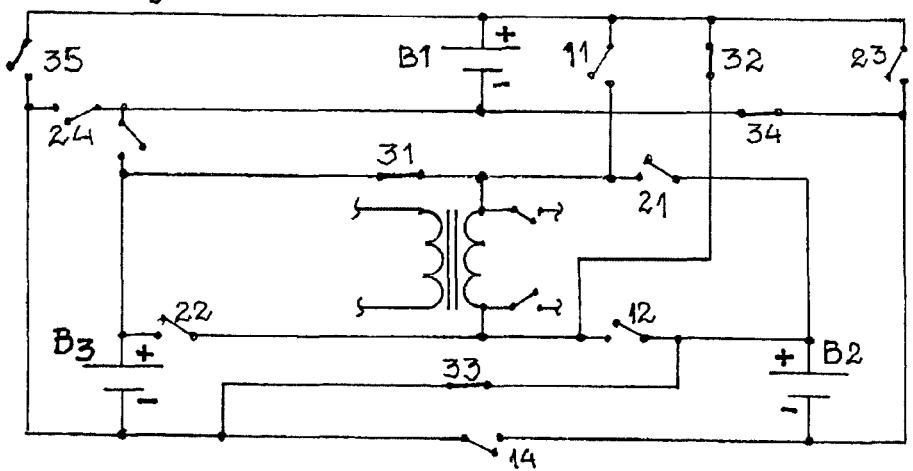

FIGS. 6-8 are schematic views of sequences of recovering utilized electric charge with batteries.

Figure 9:
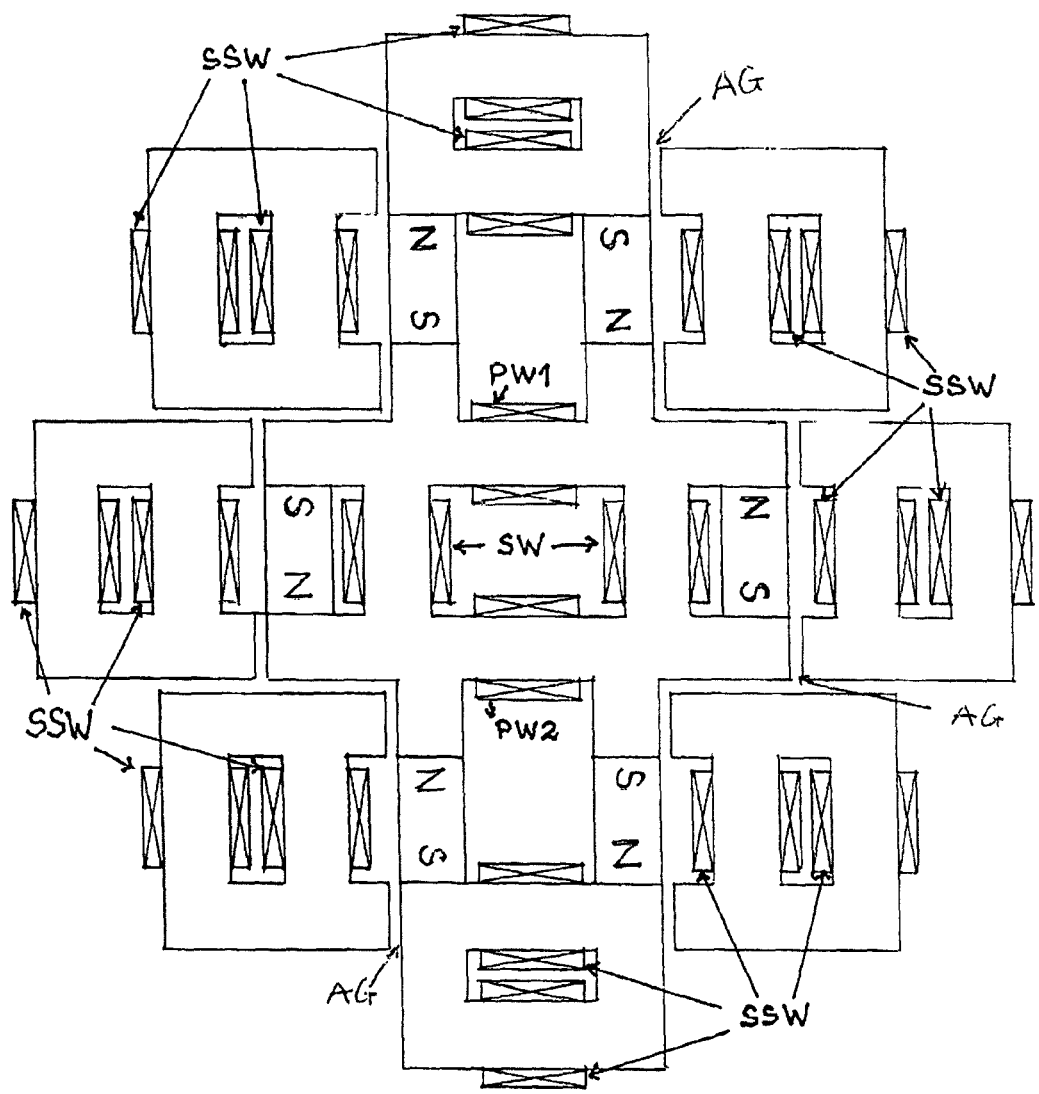

FIG. 9 is a schematic view of a magnetic circuit containing more permanent magnets in main magnetic path, primary windings, secondary windings, sub-secondary windings and sub-magnetic core separated by air gaps.

FIGS. 10-14 are elevation views of variations of a modified multiple magnetic cores, permanent magnets and sub-magnetic core separated by air gaps.

DETAILED DESCRIPTION

FIGS. 1A-1C show a modified voltage-doubler circuit with electronic switches ES3 and ES4, applied at the primary winding of magnetic circuit containing permanent magnets or magnetic circuit with underdamped response. FIG. 1A illustrates a modified Bridge (Delon) voltage-doubler circuit. FIG. 1B illustrates a Greinarcher scheme for voltage-doubler. FIG. 1C illustrates a Villard scheme for voltage-doubler. When electronic switches ES1-ES2 are ON and electronic switches ES3-ES4 are OFF, the primary winding is energized. Electronic switches ES3-ES4 must be OFF in order to prevent current from voltage source to flow to the capacitors Cp1, Cs1. When the primary winding is de-energized, ES1-ES2 are OFF, then ES3-ES4 are immediately ON, all electric energy in primary winding is stored on capacitors Cp1. All electric energy in secondary winding is stored on capacitor:

Generating electric energy during the time of transferring high-potential electric charge stored on capacitors of primary secondary and sub-secondary coils of winding can be performed by using small capacitance with low-leakage and high-voltage characteristics to store electric charge.

As shown in aspect of the invention, precise switching of all electronic switches play an important role in energy conversion of the Tran-generator.

FIGS. 1D-1F are voltage-doubler circuits applied at secondary and sub-secondary windings. FIG. 1D illustrates a Bridge (Delon) scheme for a voltage-doubler circuit. FIG. 1E illustrates a Greinarcher scheme for a voltage-doubler. FIG. 1F illustrates a Villard scheme for voltage-doubler.

FIGS. 2A-2B illustrate the modified transformer unit, utilizing permanent magnets and multiple secondary and sub-secondary coils of winding, arranged in a fashion to generate additional energy from utilized energy. FIGS. 1A-1F are applicable to be incorporated as the magnetic unit shown in FIG. 2A-2B.

FIGS. 2A-2B illustrates a magnetic unit with two primary windings PW1-PW2, two permanent magnets, two secondary windings SW1-SW2 and four sub-secondary windings SSW1-SSW2. In instance I (FIG. 2A), the primary windings PW1-PW2 are not energized. The permanent magnet magnetic path only goes through the windings PW1-PW2 and secondary windings SW1-SW2 because the path through secondary windings SW1-SW2 is lesser in magnetic resistance than through the air gap path to the sub-secondary windings SSW1-SSW2. When the primary windings PW1-PW2 are energized in instance II (FIG. 2B), the magnetic flux paths of the primary windings PW1-PW2 appear and passes through the secondary windings SW1-SW2. The increasing magnetic flux in the primary coil of windings induces an inductive voltage across the secondary windings, at the same time, blocks magnetic flux of permanent magnets flowing in the main magnetic path. The magnetic paths of the permanent magnets are deflected and forced to take the sub-magnetic paths (less magnetic resistance) through the sub-secondary windings SSW1-SSW2 via air gaps AG1-AG2 to make a closed loop circuits. This in turns, generates sub-inductive voltages across the coils of winding, wrapped around the sub-magnetic paths. This instance also applies simultaneously with sub-secondary windings SSW3-SSW4 via air gap AG3-AG4.

In instance III where the primary winding PW1 is not energized, the primary coil magnetic flux collapses, and the magnetic flux path of the permanent magnets automatically returns to the initial path (path of least resistance) as shown in FIG. 2A. This results in extra inductive voltage from primary, secondary and sub-secondary coils of windings.

FIG. 3 is a schematic of the combination of the aspects of recovering of utilized electric charge with an electric circuit containing two identical capacitors in parallel (along with the voltage-doublers in any if FIGS. 1A-1F and transformer of FIG. 2A). FIG. 3 also illustrates a transformer with primary winding, secondary winding and electronic switches ES1-ES8. VD1 and VD2 are voltage-doublers or full-wave rectifiers with (almost) no voltage drop, connected with the primary winding via two electronic switches ES3 and ES4. Two identical capacitors C1-C2 are connected in parallel and battery B1 is in series with capacitor C1 or C2 by turn, via ES7 and ES8 respectively.

Two electronics switches (preferably without intrinsic body diode) at high-side ES1 and low-side ES2 of the primary winding provides a way for the energy stored on capacitors Cp1 and Cs1 of the circuit to be transferred to any selected battery.

Recovering a utilized electric charge can be performed by cycling two ways: In instance I, supposed that there is a voltage Va across the capacitor C1, when electronics switches ES1, ES2, ES6 and ES7 are ON and ES3, ES4, ES5 and ES8 are OFF, a high-potential electric charge flows from C1 through battery B1 via electronic switches ES1, ES2 and releases its energy through primary coil of winding to be stored on capacitor C2, supposed that the voltage of accumulated charge in C2 is also Va. Therefore, the voltage across capacitor C1 becomes zero. (C1 and C2 are identical capacitors).

In instant II, when electronics switches ES1, ES2 and ES5-ES8 are OFF, immediately electronics switches ES3 and ES4 are ON to regain electric energy from collapsed magnetic field and from returning magnetic fields of permanent magnets embedded in main magnetic path (RLC circuits with underdamped response are not mentioned here). Electric energy in the primary winding is regained via the voltage-doubler VD1, on capacitor Cp1 and battery B1. Electric energy in secondary windings is harvested via voltage-doubler VD2 on capacitor Cs1 and battery B1.

In instant III, when electronics switches ES8 is ON, capacitor C2 with voltage Va is in series with battery B1. Voltage across capacitor C1 is zero. When electronic switches ES1, ES2, ES5 are ON, electronics switches ES3, ES4, ES6 and ES7 are OFF, the high-potential electric charge, flows from capacitor C2 through battery B1 via electronic switches ES1, ES2, and releases its energy through primary coil of winding to be stored on capacitor C1. Voltage across capacitor C1 is Va again.

In FIG. 4, the process of recovery of the utilized electric charge is discussed previously and will not be repeated. The capacitor Cp1 and Cs1 also act as voltage-sources in combination with transformers Tp1 and Ts1 respectively. At high-side is electronic switch ES9 and ES10 for ON\OFF, low-side is connected in series with the positive pole of the selected battery B1. When electronic switches ES9-ES10 is ON, high-potential electric charge stored on capacitor Cp1 and Cs1 respectively, is transferred to the battery B1 through the primary coil of winding. Simultaneously, inductive voltage across secondary coil of winding are generated, the inductive energy is stored on an another appropriate capacitor Cp2 and Cs2. Capacitor Sp2 and Cs2 are ready for the next transferring of high-potential electric charge.

In FIG. 5, the process of recovering electric charge stored in capacitors C1-C2 is discussed previously and will not be repeated. The differences between FIG. 5 and FIG. 4 are capacitors Cp1 and Cs1 are in series with respective batteries B2-B3 and two respective electronic switches ES9-ES10 and ES11-ES12 at two ends of each respective transformer Tp1 and Ts1. The transformer Tp1 and Ts1 can contain permanent magnets. Each transformer Tp1 and Ts1 is accompanied with voltage-doubler circuit VD3 and VD5 for transformer Tp1 and respective voltage-doubler VD4 and VD6 for transformer Ts1. The process of transferring high-potential electric charge is described in paragraph [0016]. The extra energy is now stored in capacitors Cp2, Cs2, Cp3, Cs3, and is ready for the next transferring to another device or storage or winding.

FIGS. 6-8 are schematic of an aspect of the invention illustrating method and circuit of recovering the utilized electric charge, containing at least three identical batteries and programmable switching technique. All switches are electronic switches without intrinsic body diode. Only switches mentioned in each of FIG. 6, FIG. 7 and FIG. 8 are in ON position.

In instant I, FIG. 6, battery B3 is in series with battery B1 via electronic switch 13, battery B3 is in parallel with battery B2 via electronic switch 14. A desired electric charge flows from battery B3 and B1 to B2 via electronic switch 11 and 12.

In instant II, FIG. 7, battery B1 is in series with battery B2 via electronic switch 23, battery B1 is in parallel with battery B3 via electronic switch 24. The same desired electric charge flows from battery B1 and B2 to B3 via electronic switch 21 and 22.

In instant III, FIG. 8, battery B2 is in series with battery B3 via electronic switch 33, battery B2 is in parallel with battery B1 via electronic switch 34. The same desired electric charge flows from battery B2 and B3 to B1 via electronic switch 31 and 32.

Note that if electronic switch 35 can be utilized to connect battery B1 in series with flattery B3 and via electronic switch 34 to connect battery B1 in parallel with battery B2. A desired electric charge can flow from battery B1 and B3 to B2.

There are many different forms and constructions of Tran-generators. FIGS. 9-14 are schematic of another aspects of the invention as shown in FIG. 2A.

FIG. 9 shows a magnetic circuit containing 6 permanent magnets in main-magnetic path, 2 primary windings, two secondary windings and 16 sub-secondary windings.

Sub-secondary windings are wrapped on parts of the sub-magnetic paths or main magnetic path where magnetic flux of embedded permanent magnets come and go. For simplicity of the drawings, sub-secondary windings are not mentioned in FIGS. 9-14.

FIGS. 10-14 are various architect of the Tran-generator. The thick line on FIGS. 10, 11, 12, 13 and 14 denote air-gaps.

Figure 10:
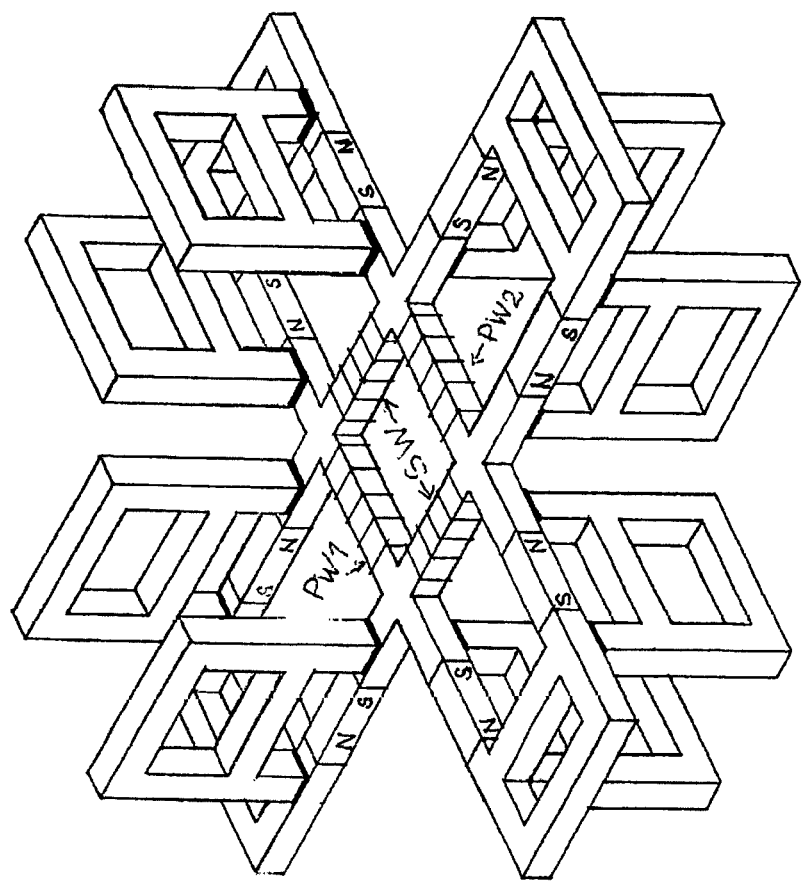

FIG. 10 shows a magnetic circuit containing 8 permanent magnets in main-magnetic path, 2 primary windings, 2 secondary windings and 24 sub-secondary windings, not drawn here.

Figure 11:
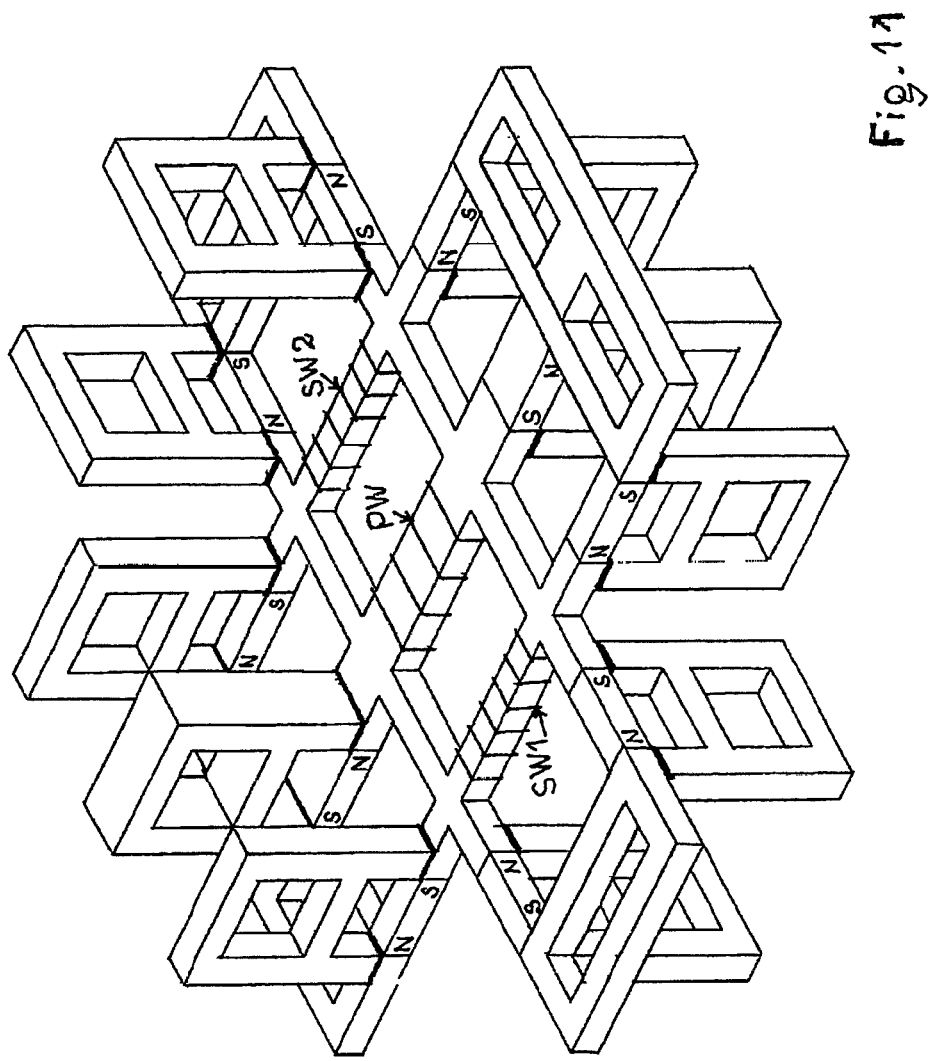

FIG. 11 shows a magnetic circuit containing 10 permanent magnets, 1 primary winding, 2 secondary windings and 32 sub-secondary windings, those are not drawn here.

Figure 12:
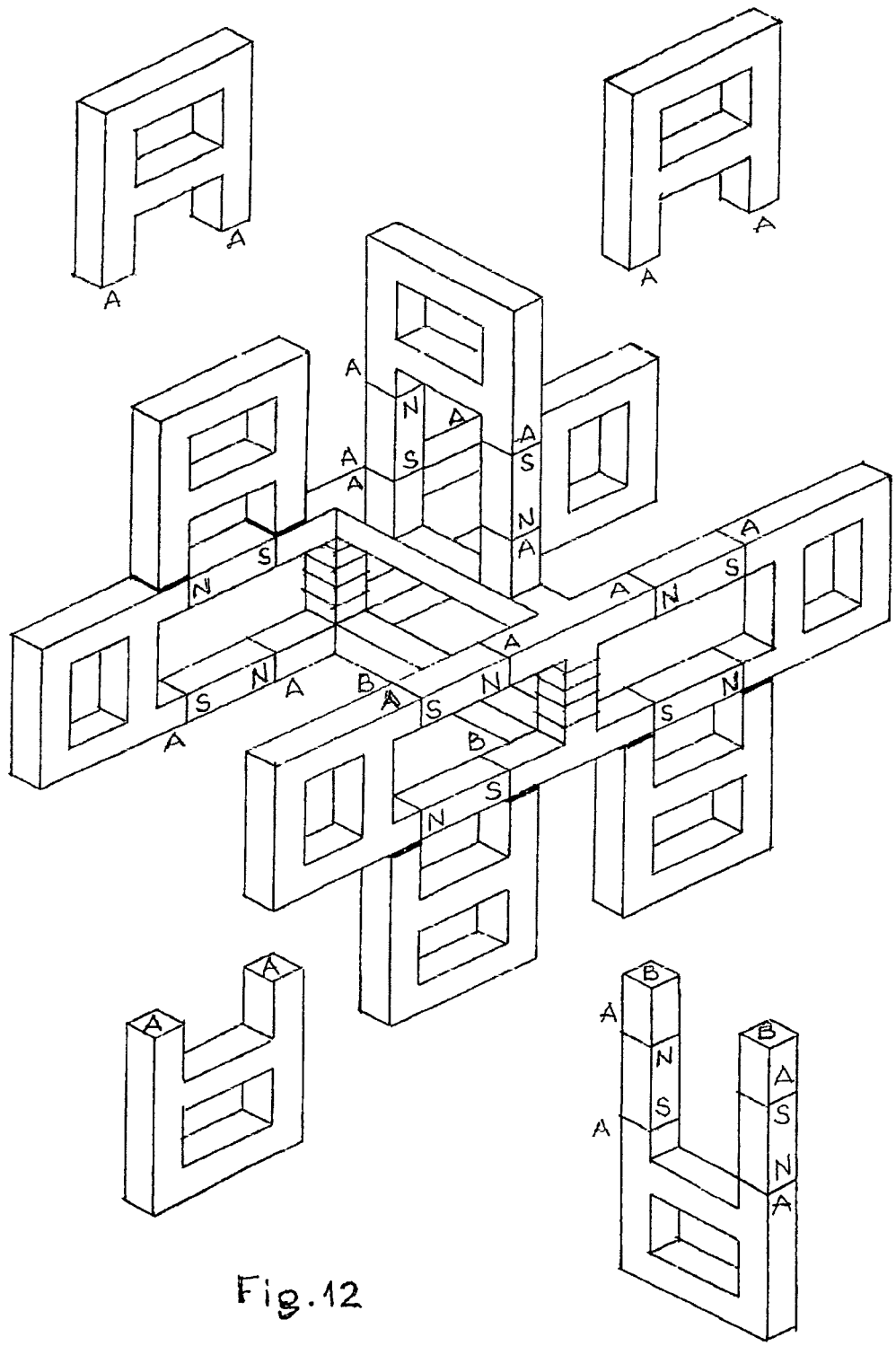

FIG. 12 shows a magnetic circuit containing 12 permanent magnets 2 primary windings, 2 secondary windings and a plurality of sub-secondary windings, those are not drawn here.

Figure 13:
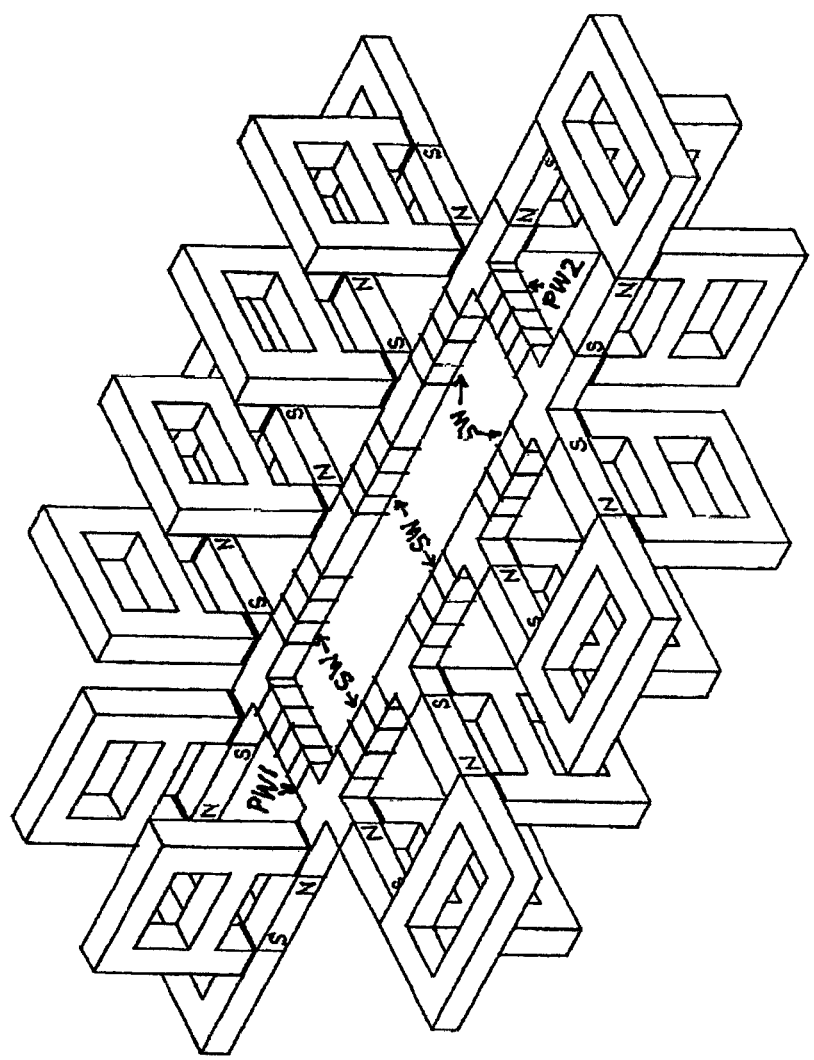

FIG. 13 shows a magnetic circuit containing 12 permanent magnets (more permanent magnets are possibly), a plurality of secondary windings and a plurality of sub-secondary windings, not drawn here.

FIG. 14 shows an indication of interaction between magnetic flux of primary windings and magnetic flux of permanent magnets, thus no secondary windings and no sub-secondary windings are drawn here.

The combinations of FIGS. 3-14 illustrate some scenarios of systems of the preferred aspects of the portions of the invention, it is understood that this system is given as an example, and that numerous changes in the details of construction, fabrication and use, including the combination, configuration and arrangement of parts, may be used without departing from the breadth and scope of the invention.

While there has been illustrated and described what is at present considered to be a preferred aspects of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An electromagnetic generator comprising:
   a plurality of voltage sources;
   a plurality of coils;
   a plurality of electrical charge storage unit;
   a plurality of switching devices;
   a plurality of first switching devices arranged to isolate both in and out connections of an input coil, of said plurality of coils, from a closed loop circuit;
   a plurality of activation switches to activate charging and not charging of said input coil;
   wherein said input coil charging energy is captured and stored in said electrical charge storage unit based on the activation of predetermined set of said plurality of switching device;
   wherein said input coil discharging energy is regained and stored in said electrical charge storage unit based on the de-activation of predetermined set of said plurality of switching device.

2. An electromagnetic generator of claim 1, further comprising:
   a plurality of magnetic core constructed with a plurality of closed loops paths for accommodating a plurality of magnetic closed loop paths;
   at least one permanent magnet embedded in said magnetic core;
   a plurality of sub-magnetic cores located in proximity to said magnetic core for accommodating a plurality of magnetic closed loop paths for generating a plurality of electrical outputs;
   a plurality of output coils extending around portions of both said plurality of magnetic closed loop paths for providing electrical outputs;
   a switching device driving electrical pulse sequences through said input coil;
   wherein said input coil extending around portions of said plurality of magnetic closed loop paths;
   wherein when said input coil is energized with said electrical pulse, said input coil produce a magnetic flux deflecting said permanent magnet unbiased magnetic paths through said magnetic closed loops resulting in a sweeping magnetic flux;
   wherein the deflected unbiased magnetic paths are biased to take said magnetic paths through said sub-magnetic cores closed loop paths resulting in another sweeping magnetic flux; and
   wherein said sweeping magnetic flux induces electrical energy through said plurality of output coils.

3. An electromagnetic generator of claim 1, further comprising:
   an input coil connected to said voltage source;
   an output coil located approximate from said input coil;
   a plurality of switching devices for opening and closing a closed loop circuit including said voltage source, said coil and said storage circuit, wherein said plurality of switching devices are arranged to Isolate both in and out connections of said coil from said closed loop circuit;
   wherein when said plurality of switching devices are closed, a closed loop is created for said voltage source and said input coil, said voltage source charges said input coil and a magnetic field is generated inducing a charge inductive voltage across said input coil and output coil;
   wherein when said plurality of switching devices opens, said input coil magnetic field collapses inducing a discharge Inductive voltage across said input coil and output coil;
   wherein said charge inductive voltage and said discharge inductive voltage are stored in said storage device.

4. An electromagnetic generator of claim 1, further comprising
   a plurality of first capacitor and second capacitor;
   a plurality of first switch and second switch to redirect path of said first capacitor and second capacitor with said electrical charge storage unit;
   a plurality of activation switches to activate charging and not charging of said input coil;
   wherein said input coil charging energy is regained and stored in said first capacitor or said second capacitors based on the activation of said first switch or said second switch;
   wherein said first capacitor or said second capacitor is in series with said electrical charge storage unit based on the activation of said first switches or said second switches.

5. An electromagnetic generator of claim 1, further comprising:
   a plurality of first capacitor and second capacitor;
   a plurality of first switch and second switch to redirect path of said first capacitor and said second capacitor with said electrical charge storage unit;
   a plurality of activation switches to activate charging and not charging of said input coil;
   wherein said input coil charging energy is regained and stored In said first capacitor or said second capacitors based on the activation of said first switch or said second switch;
   wherein said first capacitor or said second capacitor is in series with the battery based on the activation of said first switches or said second switches.

6. An electromagnetic generator of claim 1, further comprising:
   a plurality of switches to activate charging and not charging of said coil;
   a first set of switch among said plurality of switches;
   a second set of switch among said plurality of switches;
   a third set of switch among said plurality of switches;
   wherein when said plurality of said first set of switch are activated, a first battery among said plurality of electrical charge storage unit charges said input coil at the input side of said input coil, and a second and third batteries among said plurality of electrical charge storage unit are connected in series at the exit side of said input coil;
   wherein when said plurality of said second set of switch are activated, said second electrical charge storage unit among said plurality of electrical charge storage unit charges said input coil at the input side of said input coil, and said third and first electrical charge storage unit among said plurality of electrical charge storage unit are connected In series at the exit side of said input coil;

wherein said input coil charging energy is regained and stored in said plurality of electrical charge storage unit connected at the exit side of the coil based on the activation of said plurality of switch.

7. An electromagnetic generator of claim 6, wherein stored energy regained by said first electrical charge storage unit are re-used to charge said input coil when activation switch among said plurality of switch modify the interconnection of said plurality of electrical charge storage unit for said first electrical charge storage unit to charge the input coil.

8. An electromagnetic generator of claim 1, further comprising a plurality of regain capacitor;

wherein said regain capacitor stores inductive voltage regained from collapsing magnetic field of said input coil;

wherein stored high-potential electric charge from said regain capacitor is transferred to selected voltage source to be used to generate electric energy.

9. An electromagnetic generator of claim 1, further comprising:

a soft magnetic wire
a copper magnetic wire
wherein said copper magnetic wire wounding begins from the outside to the inside of said coil, and the soft magnetic wire is wounded from the inside to the outside with the same direction.

10. An electrical charge storage system comprising:
a voltage source;
a storage device;
an input coil connected to said voltage source;
an output coil located approximate from said input coil;
a plurality of switching devices for opening and closing a closed loop circuit including said voltage source, said input coil and said storage circuit, wherein said plurality of switching device are arranged to isolate both in and out connections of said input coil from said closed loop circuit;
wherein when said plurality of switching device are closed, a closed loop is created for said voltage source and said input coil, said voltage source charges said input coil and a magnetic field is generated Inducing a charge inductive voltage across said input coil and output coil;
wherein when said plurality of switching device opens, said input coil magnetic field collapses inducing a discharge inductive voltage across said input coil and output coil;
wherein said charge inductive voltage and said discharge inductive voltage are stored in said storage device.

11. An electrical charge storage system comprising:
a coil and battery;
a plurality of first capacitor and second capacitor;
a plurality of first switch and second switch to redirect path of said first capacitor and second capacitor with said battery;
a plurality of activation switches to activate charging and not charging of said coil;
wherein said coil charging energy is regained and stored in said first capacitor or said second capacitor based on the activation of said first switch or said second switch;
wherein said first capacitor or said second capacitor is in series with said battery based on the activation of said first switch or said second switch.

12. An electrical charge storage system comprising:
a plurality of battery;
a coil;
a plurality of switches to activate charging and not charging of said coil;
a first set of switch among said plurality of switches;
a second set of switch among said plurality of switches;
a third set of switch among said plurality of switches;
wherein when said plurality of said first set of switch are activated, a first battery among said plurality of battery charges said coil at the input side of said coil, and a second and third batteries among said plurality of batteries are connected in series at the exit side of said coil;
wherein when said plurality of said second set of switch are activated, said second battery among said plurality of battery charges said coil at the input side of said coil, and said third and first batteries among said plurality of batteries are connected in series at the exit side of said coil;
wherein said coil charging energy is captured and stored in said plurality of battery connected at the exit side of the coil based on the activation of said plurality of switch.

13. The electrical charge storage system of claim 12, wherein stored energy captured by said first batteries are re-used to charge said coil when activation switch among said plurality of switch connects said first battery to charge said coil.

* * * * *